United States Patent [19]

Sakai

[11] Patent Number: 4,591,441
[45] Date of Patent: May 27, 1986

[54] METHOD AND APPARATUS FOR SEPARATING OIL FROM WATER

[75] Inventor: Utaro Sakai, Hamamatsu, Japan

[73] Assignee: Maruchi Koken Kabushiki Kaisha, Hamamatsu, Japan

[21] Appl. No.: 492,736

[22] Filed: May 9, 1983

Related U.S. Application Data

[63] Continuation-in-part of Ser. No. 213,011, Dec. 4, 1980, abandoned.

[30] Foreign Application Priority Data

Dec. 10, 1979 [JP] Japan .................................. 54-160013

[51] Int. Cl.$^4$ ............................................. B01D 13/00
[52] U.S. Cl. .............................. 210/649; 210/DIG. 5; 210/307
[58] Field of Search ................. 210/490, DIG. 5, 502, 210/317, 649, 307

[56] References Cited

U.S. PATENT DOCUMENTS

| | | | |
|---|---|---|---|
| 3,019,904 | 2/1962 | Stecher | 210/DIG. 5 |
| 3,083,118 | 3/1963 | Bridgeford | 210/DIG. 5 |
| 3,228,527 | 1/1966 | McPherson | 210/DIG. 5 |
| 3,237,771 | 3/1966 | Greenawalt | 210/DIG. 5 |
| 3,645,398 | 2/1972 | Fiocco | 210/DIG. 5 |
| 3,865,732 | 2/1975 | Terhune et al. | 210/307 |
| 3,951,814 | 4/1976 | Krueger | 210/DIG. 5 X |
| 3,965,004 | 6/1976 | Garber | 210/DIG. 5 |
| 4,053,414 | 10/1977 | in't Veld | 210/DIG. 5 |
| 4,058,463 | 11/1977 | Bartik | 210/DIG. 5 |
| 4,067,809 | 1/1978 | Kato | 210/DIG. 5 |
| 4,139,463 | 2/1979 | Murphy et al. | 210/307 |
| 4,148,731 | 4/1979 | Brigante | 210/649 |
| 4,194,998 | 3/1980 | Fanta et al. | 210/DIG. 5 |
| 4,217,210 | 8/1980 | Heidenreich | 210/307 |
| 4,218,311 | 8/1980 | Newrick | 210/307 |

FOREIGN PATENT DOCUMENTS 659628  3/1972  Japan ............................ 210/DIG. 5

Primary Examiner—Frank Spear
Attorney, Agent, or Firm—Oblon, Fisher, Spivak, McClelland & Maier

[57] ABSTRACT

An oil separation method and apparatus for separation by coarse particulation which includes the steps of forming a coarse particulating element with an oil water separation layer which includes forming a water insoluble hydrogel which has an oil resisting and oil repelling function as well as water permeating and absorbing function on the surface of a porous material and/or the surface of a fluid passage to be contacted with oil holding water and alternately passing the oil holding water through the surface of the element to perform coarse particulation separation of oil at the surface of the element. The oil water separation device corresponding thereto includes at least one coarse particulating element forming a layer which include a non-water soluble hydrogel layer with an oil water separation function and having both an oil resisting and oil repelling function as well as a water permeating and water absorbing function and a mechanism for passing oil holding water alternately from one side or the other of the element.

6 Claims, 13 Drawing Figures

METHOD AND APPARATUS FOR SEPARATING OIL FROM WATER

This application is a Continuation-in-part of U.S. patent application Ser. No. 213,011 filed Dec. 4, 1980, now abandoned.

BACKGROUND OF THE INVENTION

1. Field of the Invention

This invention is related to the method and device for oil water separation by coarse particulation or coalescence of the oil contents to separate oil effectively from such oil holding water including finely divided and scattered oil or oil in an emulsion state.

2. Description of the Prior Art

Conventional methods of oil separation from oil holding water include a gravity separation method, filtration method, adsorption method, cohesion disposition method, air floating method, microbiological process, electrolytic method, physical chemistry method and a coalescing or coarse particulating method.

The gravity method can only be applicable for coarse oil particles, and not for the separation of finely divided oil while the filtration method easily causes clogging, and requires large equipment for the back flushing process which is also difficult to prevent from clogging completely. The air floating method also requires a large system and makes it impossible to separate finely divided oil. The microbiological method requires large equipment and a long processing time, and the electrolytic or physical chemistry method is accompanied by secondary processing so as to result in problems of larger installation and complicated processing. Further, the normal type coarse particulation method is an ideal method but, however, cannot be applied for the range of emulsion type particles of a dimension smaller than $10\mu$ except for precision filtration or ultrafiltration. The ultrafiltration can only be used for specific cases, because the equipment is large and expensive and the running cost is also high. On the other hand, an adsorbent, depending on its lipophilic nature, is expensive and a great deal of manpower is required for replacing it at a saturating point based upon to its adsorption limit being a major drawback due the impediment of oil film in the case of high oil concentration and high viscosity oil. The method of using an adsorbent as coarse particulation of smaller than $10\mu$ oil particle content is impossible, and therefore this method is not adequate for the separation of emulsified materials. No practical small equipment for economically performing coarse particulating separation in the range of oil content with smaller than $10\mu$ particles is available at the present time.

SUMMARY OF THE INVENTION

This invention is based upon recognition of this difficulty and has resulted in a method and apparatus to efficiently separate high concentration and/or high viscous oil or emulsified oil by forming a specific layer with an oil water separation function. This layer consists mainly of a water insoluble hydrogen layer having an oil resisting and oil repelling function as well as water permeating and water absorbing functions and is located on the surface part of porous material and/or the surface part of a fluid passage. The invention is based on the idea of using the specific coarse particulating element to which oil holding water is passed through by alternatively changing the direction of flow, and adding structures which may suit diversified conditions such as high concentration or high viscosity oil or emulsified oil, to allow the coarse particulation of oil in a state smaller than $10\mu$ particle to be so as, and thus offer a novel means of oil water separation.

The invention attains a new field of removing the oil of a particle size smaller than $10\mu$ class, which had been desired by society for a long period, and is a development in the field in which many research and development projects have been performed without success. Thus the present invention has great meaning in that it will enable one to cope with the requirement of a 15 PPM separation which is required in the performance of marine use of an on-board oil water separator based on the Sea Pollution Prevention Act in accordance with the IMCO Convention.

In the coarse particulating process of this invention, an oil water separating element consisting of specific porous material is used. It is important that a water insoluble hydrogel layer is formed on the porous material surface to be contacted with oil holding water and/or to the liquid passage surface. For example, various types of synthetic fiber, inorganic fiber, natural fiber, natural pulp, synthetic pulp, etc., are used to form porous material, on which a specific water insoluble hydrogen layer is formed.

The types of water insoluble hydrogen or its means of formation are not specifically limited, and can be selected and exemplified in a wider range. For example as the means of forming hydrogel, the following are possible: (1) A method of making a water solution of proper mixture of a water soluble monomer such as acrylamide, acrylic calcium or acrylic soda with methylene bisacrylamide or N-methylolacrylamide added to a polymerizing catalyzer such as ammonium persulfate or persulfate soda, potassium persulfate, hydrogen peroxide and a catalyzer such as ammonium chloride or ammonium phosphate, is prepared, and such solution is adhered to the porous sheet by means of immersion, painting, spraying, etc., and forms a water insoluble hydrogen by drying at a proper temperature of about 80° to 110° C.; (2) a method of making a water solution of material having a plus (+) ion charge (compounds having a cation charge such as pyridine or 4th grade ammonium group) with a water solution having a material having a negative (−) charge (compounds having anion charge such as carboxyl group, of sulfone group) and including applying such material to a porous sheet to adhere and allow it to combine ionically on and/or in the interior of the porous sheet to form a gel compound by the coupling reaction of a water soluble polymer such as carboxymethyl cellulose, polyphosphate, polyphosphoric acid salt, polyacrylic soda with a polyvalent metallic salt such as sulfuric magnesium or calcium chloride, i.e. adhering a water solution of polyvalent metallic salt previously by way of immersion, brushing, spraying, etc., then adding a water solution of the above stated metallic bridge formative water soluble polymetric compound and forming a gel compound by mediation of polyvalent metallic ion; (3) a method for making natural or synthetic hydrophilic polymer water insoluble without losing its water absorbing characteristics, i.e. a porous sheet is previously applied with a bridge formative agent such as chrome alum, potash alum, formalin, zinc chloride, boric acid, magnesium chloride, etc., and forms a gel compound through a chemical bridge forming reaction by adding gelatinizer such as gelatin, polyvinyl alcohol, alginic acid, mannan, or cellulose compound; or (4) a method of utilizing a material which absorbs water and swells to form a water insoluble hydrogel, for example, a method of applying a bridge formative agent (organic, soluble to solvent) for polyethylene oxide to a porous sheet by way of immersion, brushing, or spraying or a method of adding low-displacement carboxymethylcellulose, polyvinyl fiber by mix spinning or mix weaving can be utilized.

In this invention it is desirable to provide a further process for enhancing and maintaining the effect of the oil separation function such as an oil repelling function, oil collecting function, coarsing ability for oil drops, as well as forming the water absorbing gel. For example, a lipophilic agent such as a fluorine compound or chrome fluorine compound, lipophilic agent or oil collecting agent such as stearic acid compound, silicone base compound, wax compound, surface tension reducing agent or oil collecting agent such as high grade alkyl alcohol, silicone alkylene oxide are added to the water insoluble hydrogel layer, or the porous sheet will be treated with such effective agent by brushing, immersing or spraying before or after forming the water absorbing gel. The porous sheet can also be formulated with a lipophilic portion with the water absorbing gel layer. For example, an oil separating effect by oil collection, growth and separation can be improved upon by constructing filter material by means of mixed making of or mixed spinning of polyolefin fiber or pulp, synthetic fiber or glass fiber.

In this invention any material having characteristics sufficient for use as a filter, i.e. material having water permeability, water resistance, pressure resistance and durability, can be widely adopted without any restriction. For example, board, non-woven fabric, paper or foam sheet can be used. Non-woven materials such as paper or non-woven fabric made mainly of cellulose fiber such as cotton, rayon or acetyl cellulose are used after being given the characteristics of water resistance, pressure resistance, durability etc., by a reinforcing treatment such as described in the Office Gazette as Japanese patent No. 659628. A porous sheet made of woven fabric such as filter cloth can be omitted from the process as the material itself has characteristics required to filter, such as water resistance, pressure resistance; however, the reinforcement process is also applicable. Also, another method such as making a non-woven porous sheet by mixing heat melting synthetic pulp (polyolefin, nylon, polystyrene, etc.), and adhering synthetic pulp by a heating process, or applying a bridge forming compound such as urea—formalin condensation, melamine—formalin condensation, epichlorohydrin compound, methylol group compound, divinyl sulfone, etc., to the porous sheet by brushing, immersing, spraying, etc., so that the filter function will not be lost, is possible.

On the other hand, the porous sheet of this invention can be made of synthetic fiber material such as polyethylene, polypropylene, phenolic resin thread, polyester, polyamide or of inorganic fibers such as glass fiber, ceramic fiber, asbestos, or of a composite of such various fiber mixtures.

It is a preferred embodiment of this invention to use a fixing process so that specific water absorbing gel layer will not separate from the porous sheet. For example, this process is implemented by using a cation fixing agent such as polyethylene imine, epichlorohydrin polyamine, dicianidiamido—formalin condensation, or an anion fixing agent such as urea—formalin condensation, melamine—formalin condensation appropriately selected with the type of the porous sheet, and applying it after the water absorbing gel layer is formed on the porous sheet by way of brushing, immersing, or spraying to adhere to or mingle into the water absorbing gel layer.

The configuration of the element of the embodiment of this invention results in compactness, for example, for porous material such may simply be arranged in multistages, or most preferably to make structures having many tubular passages formed by corrugated cardboard flutes or similar structures of the porous material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
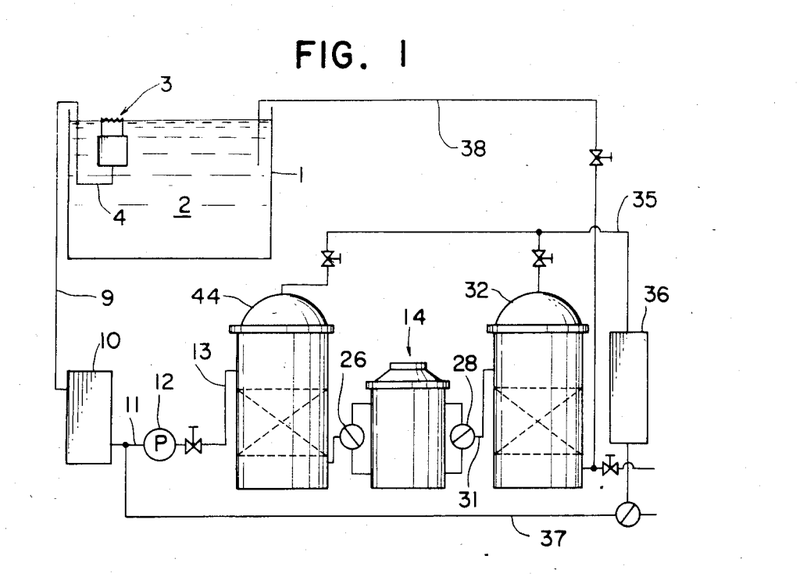
FIG. 1 is a general view of the oil holding water processing system employing the method of the present invention.
Figure 2:
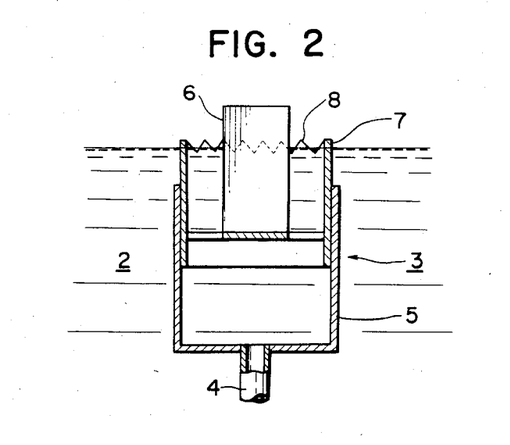
FIG. 2 is a sectional side view of the suction port equipment in the system of FIG. 1.

FIG. 1 is a general outline of the embodiment of this invention, in which numeral 1 is a crude water tank to store oil holding water. The oil holding water 2 is taken out through a suction port equipment 3. The suction port equipment 3 is constructed as shown in FIG. 2, by which outer cylinder 5 is joined with outlet tube 4 to the bottom and fixed at an appropriate plane in the crude water tank 1. Inside this outer cylinder 5 is a weir cylinder 7 having a float 6 inserted to move freely and vertically. This upper periphery of the wire cylinder 7 may be formed so as to be flat, but an uneven portion 8 of a saw edge type or notch type is preferable. The suction port equipment 3 enables automatic absorption of the high oil concentration part at the surface of the oil holding water 2 in the crude water tank 1, and is constructed to allow oil holding water 2 to flow in from the upper end of the weir cylinder 7 which moves in accordance with changes of the height of the liquid surface by way of the function of a float.

The purpose of suction port equipment 3 is to move the suction port in accordance with the change of the fluid surface so that the oil holding water will be continuously sucked in from the high oil concentrated surface part, as the fluid level of the crude water tank varies about 200 to 300 mm vertically when items to be washed are put into or removed from the crude water tank 1.

The outlet tube 4 of the suction port equipment 3 passes through pipe line 9 outside the crude water tank 1 and is connected to a strainer 10. The strainer is mainly provided to remove foreign elements in the oil holding water, and the strainer 10 is selected from conventional known products.

The oil holding water from the strainer 10 passes through a pipe 11, a pump 12 and a pipe 13 and enters into a four-stage floating or gravity separation tank 44. High concentration oil and high viscous oil are removed here. As for the four-stage floating separation tank, as high a coalescent effect as possible is obtained. The oil holding water is sent to the next coarse particulating apparatus 14 in the form of a reduced oil charge, after much of the high concentration and high viscosity oil is removed as the oil holding water passes through the four-stage floating separation tank 44. If there is no possibility in yielding high concentration or high viscosity oil in the oil holding water, the four-stage floating separation tank 44 can be eliminated and the oil holding water from the pump 12 may directly be sent to the coarse particulating apparatus 14.

Figure 3:
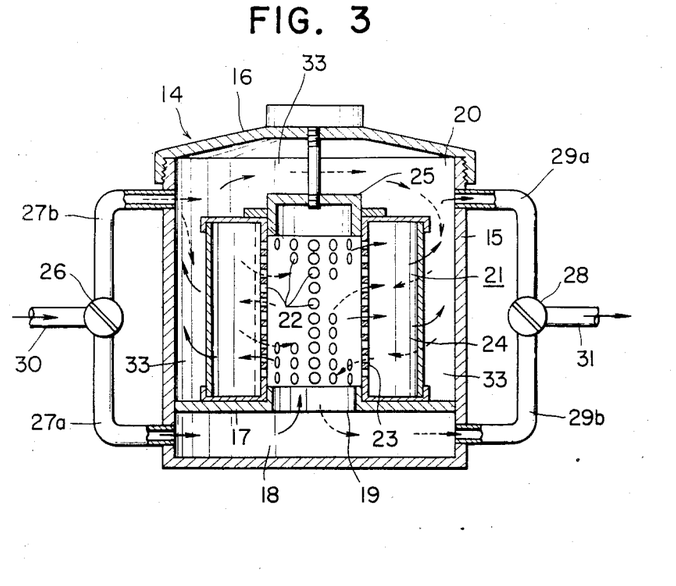
FIG. 3 is a sectional side view of the equipment of the present invention.
Figure 4:
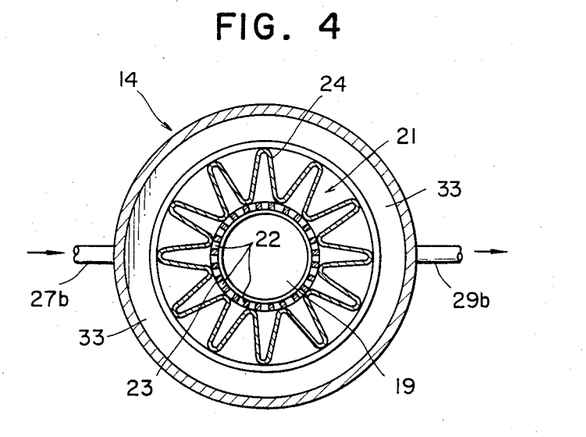
FIG. 4 is a sectional plan of FIG. 3.
Figure 5:
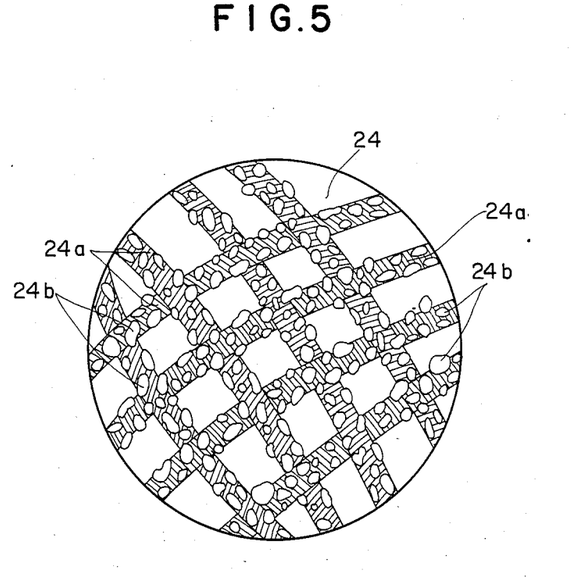
FIG. 5 is an enlarged perspective view of a coalescence element material used in the present invention.

FIG. 3 is a longitudinal sectional side view of the coarse particulating apparatus 14, and FIG. 4 is a cross-sectional plan view of the same equipment. Apparatus 14 has a middle floor 17 at the bottom of a cylindrical case 15 to form a passage chamber 18. An opening 19 is formed in the center portion of the middle floor and an element chamber 20 is formed over the middle floor 17, with chamber 20 accommodating the coarse particulating element 21 which has a porous material on which a specific oil water separating functional layer having a water permeable and absorbing function is formed to produce a coalescence element material 24. The general structure of element 21 is about the same as that of a conventional element. This is, around cylinder 23, which is formed with many through holes 22, 22 at the center part thereof, coalescence element material 24 is formed in a zigzag shape and the cylinder 23 is positioned over the opening 19 of the middle floor. The upper end of the case 15 is covered with a lid 16 to which an element holder 25 is installed to fix element 21. Also, an appropriately wide space is formed on the peripheral side and upper portion of the element 21. However, said coalescence element material 24 is prepared in the present invention by forming an oil resisting, oil repelling, water permeable and water-insoluble hydrogel layer on a lipophilic porous material such that both said lipophilic porous material 24a and oil repelling hydrogel 24b are exposed in a closely interlaced pattern as shown in FIG. 5.

Further in this apparatus, the flow in branch tube 27a and 27b is separated through a changeover valve 26 and flows to the inside of element chamber 20 and the passage chamber 18, and similarly the outlet tube 29a and 29b, which is split from changeover valve 28, is opened to flow outside, opposing the opening of the flow-in tube 27a, 27b. The flow-in side changeover valve 26 is attached to a pipeline 30 from the pump 12, and the flow-out side changeover valve 28 is attached to a pipeline 31 which leads to a floating separation tank 32.

In apparatus 14, oil holding water from the pipe line 30 flows into the apparatus 14 either from branch tube 27a or 27b according to the operation of the changeover valve 28, such that flow out from the upper branch tube 29a occurs only when flow occurs in from the lower branch tube 27a, and on the contrary flows out from the lower branch tube 29b only while flow occurs in through the upper branch tube 27b. By virtue of the operation of the changeover valves 26 and 28, the oil holding water passing in from lower branch tube 27a flows as shown by a solid arrow from the passage chamber 18 through the opening 19, the holes 22 of the cylinder 23, permeating through the material 24, through the branch tube 29a and exits to pipeline 31. Also, when changeover valves 26 and 28 are shifted to pass the oil holding water from the branch tube 27b, it flows as shown by the dotted arrow mark to permeate the material 24 from the outer side and enter into the cylinder 23, through the opening 19, the passage chamber 18 and lower branch pipe 29b and passes out to the piping. In other words, by changing the flow-in and flow-out position with respect to the apparatus 14 by the operation of changeover valves 26 and 28, the direction of oil holding water permeating through the element 21 is reversed.

When oil holding water flows into the apparatus 14 and permeates the element 21, not only the coarse particulated oil content but also finely divided and scattered oil of a size less than $10\mu$ is positively caught and collected by the oil separation function of the action of element material 24 which is formed with a specific oil water separation function layer providing a water permeating and absorbing function, and the oil collection grows into a coarse oil particle which can automatically float, and is separated out due to this floating characteristic as well as due to the oil separation function of the gel layer on the porous material 24. Moreover, by permeating the element, by virtue of its special function, emulsion type oil drops, which were hitherto considered unable to be separated, grow from a coarse particle to a coarse sized lump which can be removed.

Oil holding water thus permeating the element 21 is removed as water and a coarse oil particle through branch tube 29a or 29b and the pipeline into the next stage floating separation tank 32.

In the oil holding water many types of admixtures or solid contaminants such as suspensions and small dust particles are generally included. Therefore, the element will be choked so as to cause reduction of function during service. In many conventional systems, operation of the equipment was stopped in such case to wash the element so as to recover its function, and this resulted in a reduction of processing ability to a marked degree. This invention has effectively solved this deficiency, so as to enable the equipment to be operated continuously without stopping during cleaning of the element.

The equipment can be operated with the manipulation of changeover valves 26 and 28 to divert the inflow between the branch tubes 27a and 27b, and the outflow between the branch tubes 29a and 29b. The manipulation of these changeover valves causes the flow of oil holding water to be reversed as shown by solid line arrow mark and dotted line arrow mark in FIG. 3. This reversal flow causes admixtures such as suspension and small dust (SS) attached to the face opposite to the flow of the porous material 24 to be removed. Moreover coarse particulates and enlarged oil drops which are attached to this surface will also be removed and separated by this reversal of flow. Both sides of the element serve equally for the coarse particulation and enlargement of oil drops notwithstanding the direction of the flow of oil holding water.

The manipulation of the changeover valves 26 and 28 may be performed manually after an established time, after collection of an established amount, or by the increase of feed water pressure; however, automatic operation can be adopted by interlocking the operation of the valves 26 and 28 with a timer, a flow meter, or a feed water pressure gage. In the so-called reverse washing operation which will be performed by reversing the direction of flow of oil holding water, removal of oil particles from the element is effective. The pressure loss also occurs at one element so as to be as low as about 0.1 $kg/cm^2$ is also effective, which results in a good water permeating efficiency and therefore allows water feeding under low pressure.

Generally in oil water separation, oil will be finely divided to reduce coarse particulation separation as the feeding water pressure increases; however, in this invention a lower pressure can be used as stated before, so as to prevent oil from being finely divided, and result in a synergistic effect for better coarse particulation of oil particles.

Figure 6:
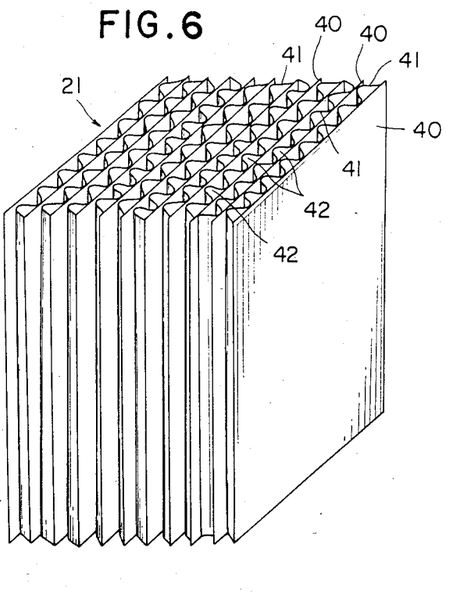
FIG. 6 is a perspective view of a second embodiment of an element used in this invention.

FIG. 6 through FIG. 9 indicate another example of the embodiment of the element and the coarse particulation equipment. In this example corrugated cardboard flute structures having many fine tubular passages are used as the element as shown in FIG. 6.

This element 21 is made similar to the element 24 of the above example; plain boards 40, 40, which are made of porous material formed with a specific oil separating function layer having a water permeable and water absorbing function and the corrugated boards, 41, 41 of the same material are placed alternately to form a laminated structure, making many fine tubular passages 42, 42, being positioned between the plain boards and the corrugated board. Either the top of or the bottom end of respective fine tubular passages 42 formed as noted above are plugged by elements 43 as shown in FIG. 6, to allow each neighboring passage to be oppositely plugged. Consequently, the oil holding water coming into each passage 42 is caused to flow only by permeating either plain board 40 or corrugated board 41. The plugging 43 can be accomplished by an arbitrary method such as pressed adhesion using adhesive, or filling the opening with adhesive filler, etc.

Figure 9:
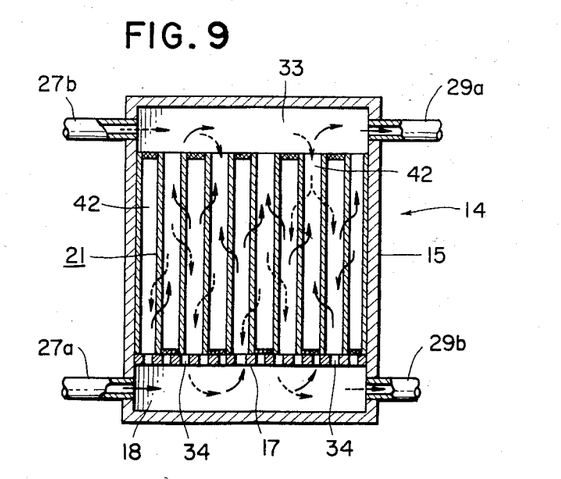
FIG. 9 is a sectional side view indicating another embodiment of this invention.

FIG. 9 indicates coarse particulation equipment accommodating the elements as shown in above FIG. 6, in which many through holes 34, 34 are formed in the middle floor 17 located on the bottom of the cylindrical case 15. The elements 21 are placed on the middle floor 17, and a cavity 33 is formed above the elements 21. Branch tubes 27a, 27b, and 29a, 29b are respectively opened to the passage chamber 18 and the cavity 33. The oil holding water flowing in from either branch tube 27a or 27b enters into the passage 42, the ends of which are opened respectively as shown by the solid line arrow mark or the dotted line arrow mark, enters into the neighboring passage permeating the plain board 40 or the corrugated board 41, enters into the passage chamber 18 or the cavity 33 through the opened end of the passage, and flows through the branch tube 29a or 29b.

Figure 7:
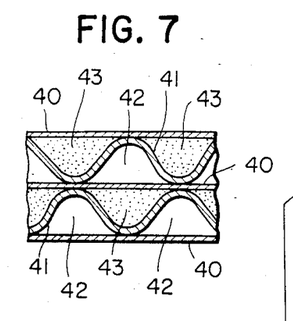
FIG. 7 is a plan view explaining the condition of the end of the element shown in FIG. 6.
Figure 8:
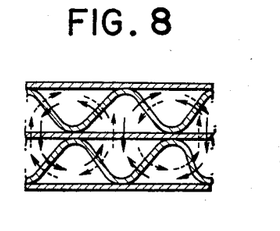
FIG. 8 is a plan view of the element of FIG. 6 explaining the condition of oil holding water permeating the element.

The structure of the flute type element 21 as shown by FIG. 6 through FIG. 8 is more efficient than the structure shown in FIG. 3 and FIG. 4, their application as shown in FIG. 9 is easier for making smaller equipment, and its use is more practical. More specifically such smaller configuration is indispensable in the case of limited installation space as in the case of marine application.

As stated above, oil holding water is treated such that coarse particles are separated and float in the water through operation of coarse particulating apparatus 14 and flows into the next floating separation tank 32 through the pipe line 31.

The floating separation tank 32 can be of any known type. In this example, physically enlarged oil particles naturally float to the upper portion of the tank 32 by means of their difference in reaction to gravity, and are taken into an oil collecting cylinder 36 from the upper part of the tank 32 through a pipe 35. As the crude water is separated from oil in this stage, the water only is returned to the side of the pump 12 through a pipeline 37 and the process is repeated in the order of the four-stage floating separation tank 44, the coarse particulating apparatus 14, the floating separation tank 32, and the oil collecting cylinder 36. The water separated with oil by the floating separation tank 32 is generally discharged, however, in case of circulating use as in a production process, the water is returned through a pipe line 38 into the water tank 1.

The above example indicates a basic oil water separation system as a unit of the coarse particulating equipment; however, multistage water flow by air alternate series installation of a plurality of the corase particulating equipment and gravity separation tanks may in many cases lead to effective results according to the condensation and viscosity of the oil included. With such a multistage water flow system, coarse particulated oil is removed prior to the next coarsing process, and interim resistance of oil in the next process can positively be reduced and the oil separation rate can be improved. Therefore, adoption of such multistage water flow system is desirable as far as the installation area permits it.

Figure 10:
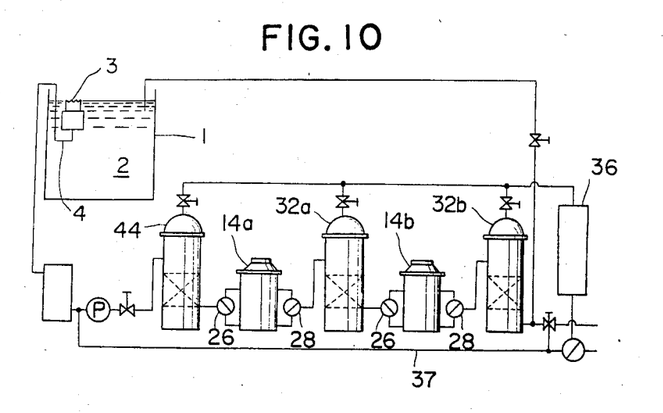
FIG. 10 is a schematic drawing indicating another example of implementation of the present invention.

FIG. 10 indicates the outline of this multistage water flow system, in which oil holding water from the crude oil tank 1 passes through the four-stage floating separation tank 44, then passes through a water flow system of serially and multistaged coarse particulating equipment and floating separation tanks in the order of the first coarse particulating apparatus 14a—the first floating separating tank 32a—the second coarse particulating apparatus 14b—the second floating separation tank 32b, and feeds almost completely separated oil into the oil collecting cylinder 36. In this case the oil from the upper part of the second floating separation tank 32b flows into the oil collecting cylinder 36 automatically or manually, and the processed water from the lower part of the second floating separation tank 32b flows into the crude water tank 1 for the case of circulating use, and is otherwise discharged.

This system is not only adequate for the efficient transient processing of contaminated water, but also demonstrates an especially superior effect in the processing of emulsified finely divided oil holding water including oil particles smaller than $1\mu$ by the effect of a surface active element, which could not be attained by conventional techniques. For example, it has been experimentally confirmed that water containing 250,000 ppm of light oil can be processed to less than 5 ppm under the test specification of ship's equipment in accordance with the IMCO-Convention, and that 5 ppm determined as the limit for industrial waste water for environmental protection can be perfectly attained.

This invention has especially novel features in permitting separation of not only the finely divided oil but also the emulsified oil content, because of the formation of the specific layer mainly consists of a water insoluble hydrogel layer having an oil water separation function as well as an oil resisting and oil repelling function.

Figure 11A:
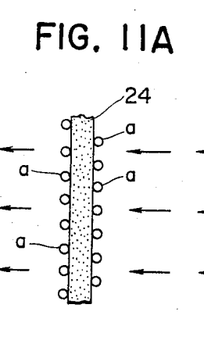
FIGS. 11(A), (B) and (C) are views explaining the process of growth of coarse particulated drops to form a larger lump of oil in the oil holding water through the element.
Figure 11B:
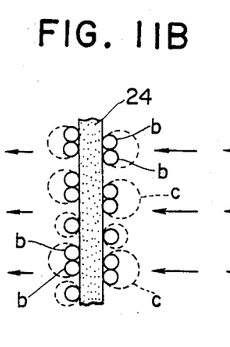
Figure 11C:
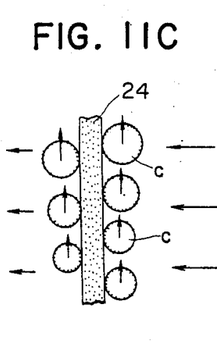

The abstract of the oil separation process is shown in FIG. 11. When oil holding water permeates through the element material 24 from one side, oil particles or emulsified oil particles in the contaminated water attach lightly onto the exposed surface of the lipophilic porous material 24a while hydrogel 24b repels said oil particles to form multiple coarse particulated oil a, and when oil in the continuously inflowing oil holding water are formed as particles in the other part, some of the particles are caught in the coarsely particulated oil particle a, and grow to become a large oil particle. By and by those grown oil particles b, b, will contact each other to grow and form a large oil lump c as shown by the dotted line. Each coalesced oil lump c sticking to the limited exposed areas of the porous material will be separated from the surface of the material 26 by the repelling action of the hydrogel 24b adjoining the exposed areas of the porous material 24a, and is transformed to have a floating condition due to the self floating function in the oil holding water as shown by the arrow mark and begins to float. Many of these growing oil particles or lumps can easily absorb SS, and can remove SS as well as oil from the oil holding water.

Another special feature of this invention is that, because of its desirable SS removing performance stated above, the strainer 10 placed upstream of the entrance in the coarse particulating apparatus 14 is not required to have such a fine straining mesh to collect even fine SS. For the requirement to catch relatively large SS only, a strainer of about 30 to 40 mesh will be sufficient for this purpose.

The conventional method requires use of as fine a mesh as possible to catch and remove SS there, and oil drops are finely divided there because of the effect of pressure caused by passing the fine strainer, and the fine oil particles were thus emulsified to make removal of oil more difficult. On the contrary, by this invention pressure resistance of the strainer is lower, emulsification is not caused and results in easier oil separation in the coarse particulating apparatus 14, which enables almost perfect removal of emulsified oil which is prevented from being further emulsified. Further, high pressure wafer for feeding high viscosity oil to a strainer causes a deficiency in intensifying emulsification; however, the invention does not require high pressure water feeding equipment, does not cause any impediment thereof, and because of simultaneous discharge of SS entrapped in the oil particle at the surface of the element, results in efficient removal of SS simultaneously with oil separation.

Obviously, numerous additional modifications and variations of the present invention are possible in light of the above teachings. It is therefore to be understood that within the scope of the appended claims, the invention may be practiced otherwise than as specifically described herein.

What is claimed is:

1. A method of separating oil from water containing emulsified oil particles therein, comprising:
   (1) forming an oil resisting oil repelling, water permeable and water-insoluble hydrogel layer on both sides of a lipophilic porous material such that both said oil repelling hydrogel and said lipophilic porous material are exposed in a closely interlaced pattern to produce a coalescence element;
   (2) subjecting said coalescene element to water containing emulsified oil particles; and
   (3) causing said water to flow in alternate forward and reverse directions through said coalescence element.

2. A method according to claim 1, further including the step of subjecting said oil containing water to gravity separation treatment prior to step (1) to skim high concentration oil from said oil-containing water.

3. A method according to claim 2, wherein the steps (2) and (3) and the step (4) are performed alternately.

4. An apparatus for separating oil from water containing emulsified oil particles, comprising:
   a closed housing;
   fluid inlet and fluid outlet means formed in said housing for generating flow of water containing emulsified oil particles therein in alternate forward and reverse directions; and
   at least one coalescence element positioned within said closed housing, said coalescence element including a lipophilic porous material formed with an oil resisting, oil repelling, water permeable and water-insoluble hydrogel formed thereon such that both said oil repelling hydrogel and said lipophilic porous material are exposed in a closely interlaced pattern and such that said flow of water containing the emulsified oil particles passes through said coalescence element.

5. An apparatus according to claim 4, wherein said coalescence element further comprises a flute structure of corrugated cardboard forming a plurality of tubules.

6. An apparatus according to claim 5, wherein said flute structure further comprises means for closing alternate top and alternate bottom end portions of the tubules.

* * * * *